June 13, 1961 L. D. BURCH 2,987,938
VISCOUS FLUID TORSIONAL VIBRATION DAMPER
Filed June 9, 1960 2 Sheets-Sheet 1
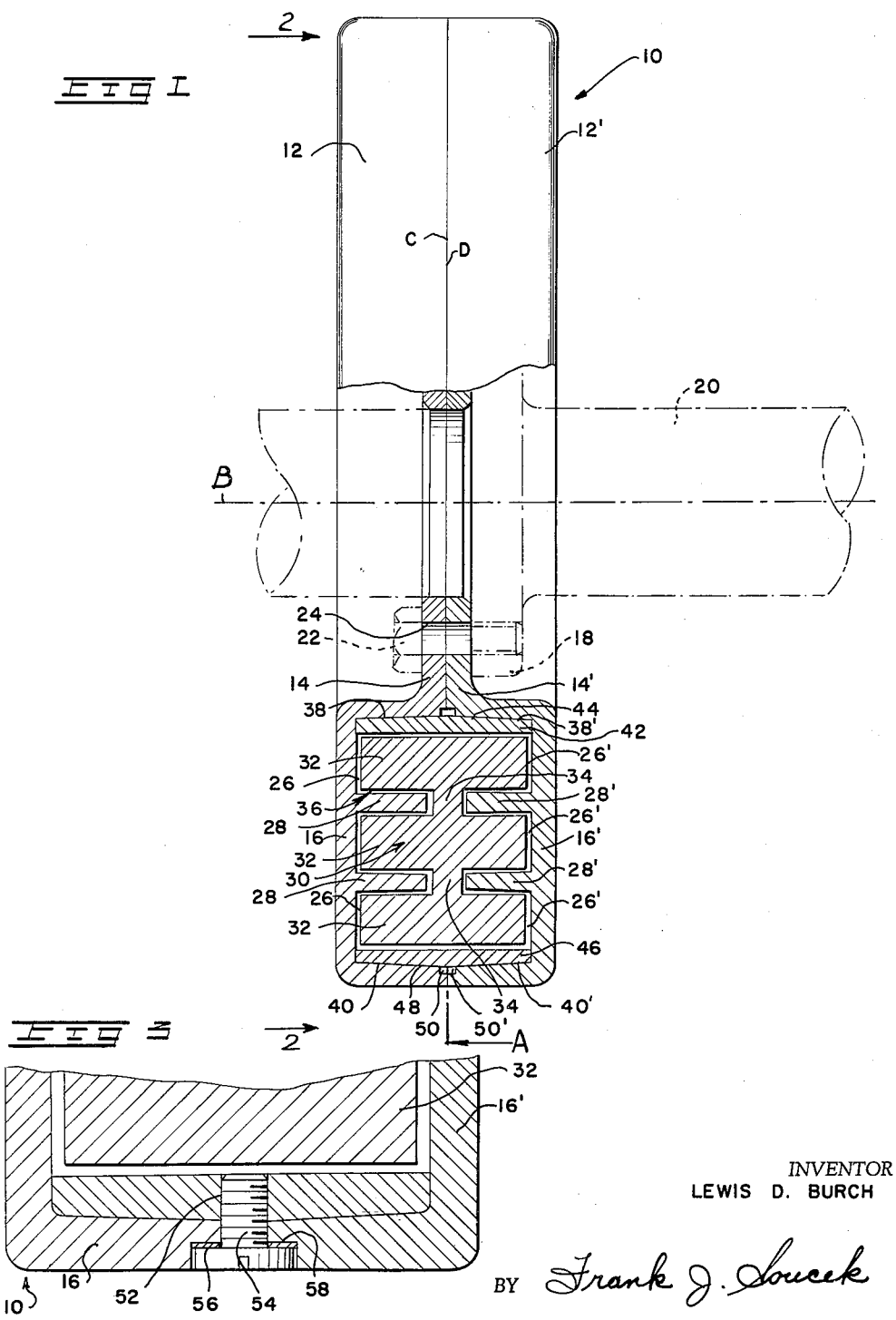
INVENTOR
LEWIS D. BURCH
BY Frank J. Soucek
ATTORNEY June 13, 1961 L. D. BURCH 2,987,938
VISCOUS FLUID TORSIONAL VIBRATION DAMPER
Filed June 9, 1960 2 Sheets-Sheet 2
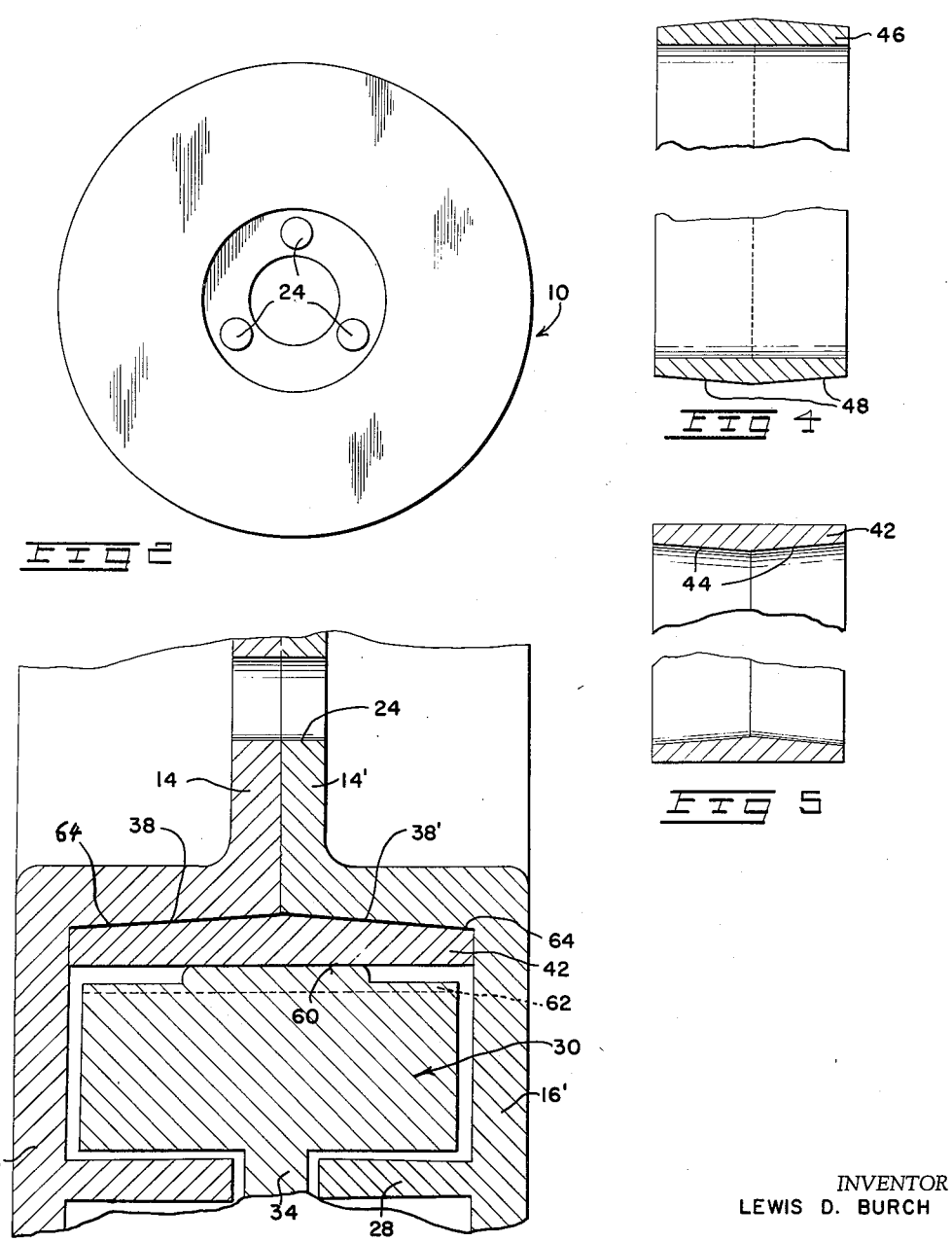
INVENTOR
LEWIS D. BURCH
BY Frank J. Soucek
ATTORNEY

United States Patent Office 2,987,938
Patented June 13, 1961

2,987,938
VISCOUS FLUID TORSIONAL VIBRATION DAMPER
Lewis D. Burch, Algonac, Mich., assignor to General Motors Corporation, Detroit, Mich., a corporation of Delaware
Filed June 9, 1960, Ser. No. 35,029
5 Claims. (Cl. 74—574)

The present invention relates to torsional vibration dampers in general and more particularly to viscous fluid torsional vibration dampers which are used for damping torsional vibrations of rotary members such as crankshafts of internal combustion engines.

In viscous fluid torsional vibration dampers an annular inertia mass or flywheel is housed with clearance in the fluid chamber of a casing. The fluid chamber contains viscous fluid such as silicon. The fluid offers a shear resistance to the damping mass and resists relative motion between the mass and the internal walls of the housing structure which is secured for rotation with a rotary member that is subject to torsional vibrations.

Prior constructions of viscous fluid vibration dampers used to have a housing composed of two members. One member which is the housing main body includes substantially one side wall, the complete circumferential wall and a hub portion; the other member is a cover member forming the other side wall. This cover is mechanically secured to the main housing body, for instance, by radial pins extending through the circumferential wall into the cover. Additional packing means are mounted between the housing parts to provide a fluid seal. In other prior constructions the cover is welded to the main housing body. In all those constructions the fluid seal is not satisfactory. It has been found that packings start to leak after a certain length of time because the material ages. Also, trouble has been experienced with welded casings because the weld seam is not always perfect and leak-proof. As soon as fluid leaks out the damper becomes useless.

The main object of the invention is to provide a viscous fluid damper that does not have the disadvantages of the known dampers and which is reliable and inexpensive to manufacture.

Another object is to provide a process of making the vibration damper which necessitates only a minimum of machining operations.

It is proposed to make the damper housing of two identical but reversed halves divided on a plane intersecting the axis of rotation of the damper at right angles and dividing the fluid chamber in two identical portions. The radially spaced internal innermost and outermost peripheral surfaces of the fluid chamber portions are slightly tapered, the tapers being inverted. The two housing halves are united to form a housing with a closed fluid chamber by means of two rings. The first ring has reversely tapered inner peripheral surfaces mating in intimate contact with the respective innermost peripheral surface of each fluid chamber portion. A second ring having reversely tapered outer peripheral surfaces mates in intimate contact with the outermost peripheral tapered surface of each fluid chamber portion. In this manner a fluid-tight damper housing is formed without packings or welding seams. The tapered internal peripheral surfaces of the fluid chamber and the tapers of the mating rings have a very shallow taper. This taper is of the self-holding type and is only enough to tightly compress the ring to cause the ring to engage the surfaces of the casing in intimate contact and lock the surfaces together. Preferably the engagement is a press-fit.

According to the invention the process of making the vibration damper comprises the steps of die casting the housing as two separate identical but reversed open halves, each half including a fluid chamber portion and a flange portion, each half terminating axially in a flat end face, the radially spaced peripheral internal wall portions of each fluid chamber lying on a small and large diameter, respectively, and forming innermost and outermost wall portions. The wall portions are cast slightly reversely tapered. Further steps include making a first metal ring having a double taper on its peripheral surface, making a second metal ring having a double taper on its outer peripheral surface, placing the first ring in mating contact with the innermost wall portion of the fluid chamber of one housing half, placing the second ring in mating contact with the outermost portion of the fluid chamber of the same half, inserting the inertia mass, placing the other housing half on both the first and second ring and applying pressure to join the housing halves and rings together to provide a housing with a fluid-tight closed chamber.

Still other steps include drilling a small porthole, pouring viscous fluid through said porthole and filling the space between inertia mass and chamber walls with viscous fluid and thereafter plugging said porthole.

Preferably the housing halves are made of die cast aluminum. The surfaces of the casing are then smooth enough so that machining is not required. The tapered internal peripheral surfaces of the housing sections also do not require machining. The end faces of the half sections may be machined and the bolt holes drilled. As said before, the tapers on the rings and the mating surfaces of the housing are very small so that the housing sections can be forced together on the rings in a press so that the metal of the rings can flow into the fine irregularities in the tapered surfaces of the housing to seal the housing against leakage of fluid.

The invention will now be more particularly described by reference to the accompanying drawings and thereafter defined by the claims.

In the drawings:
FIGURE 1 is a side view of the proposed viscous fluid vibration damper partially in cross section;
FIGURE 2 is a front view seen in the direction of the arrows 2—2 of FIGURE 1;
FIGURE 3 is another partial cross section of the vibration damper and shows the porthole with plug screw;
FIGURE 4 is a cross sectional view of the inner connecting ring for the housing halves;
FIGURE 5 is a cross sectional view of the outer connecting ring of the housing halves; and
FIGURE 6 is a partial cross sectional view of the inner portion of the fluid damper in which the inertia mass is equipped with a bearing surface.

The viscous fluid damper includes a casing or housing member 10 which is composed of two identical but reversed halves 12, 12'. Since both halves are identical, they carry the same numerals, with a prime on the right half. The dividing plane of the two halves is indicated by the letter A. This plane A intersects the axis of rotation B of the damper at a right angle. The end faces C and D of the adjoining halves lie in the plane A. Each half includes a flange portion 14, 14' and a fluid chamber portion 16, 16'. The damper is connected with its flange portions 14, 14' to the collar 18 of a crankshaft 20 or other rotary member by fastening screws 22 passing through bolt holes 24 in the flange portions 14, 14'. The crankshaft and screws are indicated in dash-dotted lines. The fluid chamber formed by the portions 16 and 16' includes a plurality of communicating annular chambers 26, 26' which are separated by annular walls 28, 28'. The walls 28, 28' extend in the axial direction from the internal side walls of the fluid chamber and end a short distance from the dividing plane A. The illustrated vibration damper has three annular chambers 26, 26'. The flywheel 30 includes a plurality of concentrically arranged annular inertia masses 32 joined by neck portions 34 to form a one-piece annular inertia member. The clearance, generally indicated at 36, between the inertia mass 32 and the annular housing portions 28, 28' varies radially as shown and described in my Patent 2,838,955, issued June 17, 1958, the greater clearance being provided about the outermost inertia mass.

The chambers 26, 26' are filled with silicon or other viscous fluid.

As can be seen from FIGURE 1, the internal innermost peripheral walls 38, 38' of the fluid chamber halves are tapered slightly with the base of the taper lying at the inner side walls. The reversed tapers 38, 38' of each half intersect theoretically in the dividing plane A when they are assembled. The internal outermost peripheral surfaces 40, 40' are also provided with the same tapers as the surfaces 38, 38'. The base of tapers 40, 40' lies in the dividing plane A. Inserted into the fluid chamber are two metallic rings firmly interconnecting the fluid chamber halves. The inner or first ring 42 has reversed tapers, i.e., a double taper 44 on its inner peripheral surface. The double taper 44 conforms with the internal peripheral surfaces 38, 38' of the fluid chamber and is in intimate contact therewith. A second ring 46 having reversed tapers 48 on its outer peripheral surface contacts the outermost internal peripheral surfaces 40, 40' of the fluid chamber. Double taper 48 corresponds to the tapers 40, 40' and is in intimate contact therewith. Both rings 42 and 46 lock the housing halves firmly together. Each housing half is provided at each end face C and D, respectively, with an annular recess 50, 50', respectively. Together the recesses 50, 50' form a relief recess for material flowing from rings 42 and 46, respectively, when the housing halves and rings are pressed together during assembly.

With the damper secured to a rotary member the inertia mass 32 is caused also to rotate therewith due to the cohesive resistance of the viscous fluid to allow relative motion between the internal walls of the housing and the flywheel. The viscous fluid between the internal walls of the fluid chamber and the flywheel dissipates torsional vibrations received by the housing 10.

As shown in FIGURE 3 the joined housing 10 is provided with a small porthole 52 to enable filling of the housing with viscous fluid. This porthole is closed by a plug 54 with self-locking screw threads. A sealing gasket 56 may be placed between the head of the screw plug and the bottom of the recess 58 in the housing.

The housing halves 16, 16' are made of die cast metal, preferably die cast aluminum. This die cast aluminum assures smoothness and accurateness of the surfaces so that machining after casting is not required. The inertia mass 30 is of shell molded cast iron or sintered iron. The inner ring 42 and outer ring 46 are illustrated in FIGURE 4 and FIGURE 5, respectively. The double taper 44 of ring 42 is located on the internal peripheral surface and the double taper 48 of ring 46 is located on the outer peripheral surface of the ring. The double or reversed tapers are shown exaggerated. The real tapers are very small and conform to the shallow tapers 38, 38' and 40, 40' of the fluid chamber portions. The taper is of the self-holding type and less than number seven. The rings 42 and 46 may be made of suitable metal like steel, bronze, or aluminum. The rings are formed to their final shape by turning them on a lathe or in case of aluminum they may be formed form extruded strip material cut to length and rolled according to the desired diameter. If the rings are made from strip material and rolled to the exact diameter, there has to be an overlap of the abutting ends. This is done by cutting the strip material along an inclined line.

The method of making the torsional vibration damper includes the steps of die casting the housing as two separate identical but reversed open halves 12, 12', each half including a fluid chamber portion 26, 26' and a flange portion 14, 14', each half terminating axially in a flat end face C, D lying in the dividing plane A, the spaced peripheral internal wall portions of each fluid chamber lying on a small and large diameter and forming innermost and outermost wall portions 38, 38', 40, 40', said wall portions being cast slightly tapering toward the end face. Then a first metal ring 42 is made having a double taper 44 on its inner peripheral surface. After that, a second metal ring 46 is made having a double taper 48 on its outer peripheral surface. Thereafter, the first ring 42 is placed in mating contact with the innermost wall portion 38 of the fluid chamber of housing section 12 and thereafter the second ring 46 is placed in mating contact with the outermost wall portion 40 of the same half. Then, the inertia mass 30 is inserted and the other housing half 12' placed on both the first and second ring 42, 46, respectively. After that, pressure is applied to join the parts together to provide a housing with a fluid-tight chamber. The pressure may be applied by an ordinary press. After the parts have been joined together a small porthole 52 is drilled and viscous fluid is poured through that porthole which fills the space between inertia mass 30 and the inner walls of the fluid chamber. Thereafter, the porthole is plugged by a screw plug 54 with self-locking threads. When the two halves 12, 12' are joined together into a complete housing with fluid chamber, the rings 42 and 46 are compressed and the material of the rings flows into the fine irregularities of the tapered surfaces 38, 38' and 40, 40' so that the housing is firmly anchored together. Deformed excess material of the rings flows into the relief grooves 50, 50'. The rings 42 and 46, when inserted for assembly, have a width which is slightly less than the depth of the two fluid chamber halves so that the ring can also expand axially when the damper is assembled. The end faces C and D of each housing half may abut in the dividing plane A or may be apart slightly. A fluid damper made according to my method is absolutely fluid-tight.

The damper shown and described before has no bearing for the mass 30. If it is desired to provide a bearing portion for the inertia mass 30, this annular bearing portion 60 is provided at the inner peripheral surface of the mass (see FIGURE 6). Bearing portion 60 is in rotatable sliding contact with the outer surface of ring 42. This bearing surface extends circumferentially around the middle of the inertia mass but does not extend the whole width (see FIGURE 6). A plurality of drain flutes or cross channels 62 are provided across the inertia mass to connect opposite sides of the fluid chamber and equalize the pressure on the opposite sides. If the double taper of the rings 42 and 48 and the taper on the circumferential surfaces of the fluid chamber are larger than indicated for the embodiment of FIGURE 1, a cement such as epoxy resin 64, indicated by heavy lines, may be put between the tapered surfaces.

What is claimed is:

1. A rotatable torsional vibration damper including a housing having an annular fluid chamber formed therein, an annular inertia mass disposed in said chamber, said inertia mass being in spaced relation to the inner walls of said chamber to provide a clearance therebetween, a viscous fluid means filling said clearance, said damper comprising a housing made of two identical but reversed halves divided on a plane intersecting the axis of rotation of the damper at a right angle and dividing the fluid chamber in two identical portions, each fluid chamber portion having radially spaced internal innermost and outermost peripheral surfaces, said innermost and outermost peripheral surfaces of the fluid chamber portions being slightly tapered, the base of the taper of the innermost peripheral surface lying on the inner side walls of the respective half, the base of the taper of the outermost peripheral surface lying in said dividing plane, a first ring having reversely tapered inner peripheral surfaces mating with the respective innermost peripheral tapered surfaces of each fluid chamber portion and in intimate contact therewith, and a second ring having reversely tapered outer peripheral surfaces mating with the outermost peripheral tapered surfaces of each fluid chamber portion and in intimate contact therewith, thus forming a fluid-tight housing.

2. A rotatable vibration damper comprising a housing with an annular fluid chamber, an annular inertia member free floating in said chamber and viscous fluid between said inertia member and the internal walls of said chamber, said housing being composed of two identical but reversed halves each including an identical annular fluid chamber portion with radially spaced peripheral innermost and outermost internal walls and an open end face, each of said walls being slightly tapered, said tapers being inverted, a first ring having two reversed tapers on its inner peripheral surface and in intimate contact with the respective innermost wall of each fluid chamber portion and a second ring having two reversed tapers on its outer peripheral surface in intimate contact with the respective outermost wall of each fluid chamber portion thus forming a fluid-tight housing.

3. A rotatable torsional vibration damper including a housing having an annular fluid chamber formed therein, an annular inertia mass disposed in said chamber, said inertia mass being in spaced relation to the inner walls of said chamber to provide a clearance therebetween, a viscous fluid means filling said clearance, said damper comprising a housing made of two identical but reversed halves divided on a plane intersecting the axis of rotation of the damper at a right angle and dividing the fluid chamber in two identical portions, each fluid chamber portion having radially spaced internal innermost and outermost peripheral surfaces, said innermost and outermost peripheral surfaces being slightly tapered, the base of the taper of the innermost peripheral surface lying on the inner side walls of the respective half, the base of the taper of the outermost peripheral surfaces lying in said dividing plane, a first ring having reversely tapered inner peripheral surfaces mating with the respective innermost peripheral tapered surfaces of each fluid chamber portion and in press-fit contact therewith, and a second ring having reversely tapered outer peripheral surfaces mating with the outermost peripheral tapered surfaces of each fluid chamber portion and in press-fit contact therewith, thus forming a fluid-tight housing.

4. A rotatable torsional vibration damper including a housing having an annular fluid chamber formed therein, an annular inertia mass disposed in said chamber, said inertia mass being in spaced relation to the inner walls of said chamber to provide a clearance therebetween, a viscous fluid means filling said clearance, said damper comprising a housing made of two identical but reversed halves divided on a plane intersecting the axis of rotation of the damper at a right angle and dividing the fluid chamber in two identical portions with an open end face, the internal innermost and outermost peripheral surfaces of the fluid chamber portions of each half of the housing being slightly tapered, said tapers being inverted, a first ring having reversely tapered inner peripheral surfaces mating with the respective innermost peripheral tapered surfaces of each fluid chamber portion and in press-fit contact therewith, a second ring having reversely tapered outer peripheral surfaces mating with the outermost peripheral tapered surfaces of each fluid chamber portion and in press-fit contact therewith, and annular adjoining relief recesses in the end face of each fluid chamber portion adjacent the apex of the double taper of said rings.

5. A rotatable vibration damper as set forth in claim 2 wherein the housing halves are die castings.

References Cited in the file of this patent
UNITED STATES PATENTS
2,838,955    Burch _____ June 17, 1958